United States Patent
Sugahara

(10) Patent No.: US 7,746,010 B2
(45) Date of Patent: Jun. 29, 2010

(54) FEEDER

(75) Inventor: Sumio Sugahara, Yokohama (JP)

(73) Assignee: SK Machinery Co., Ltd., Kanagawa (JP)

( * ) Notice: Subject to any disclaimer, the term of this patent is extended or adjusted under 35 U.S.C. 154(b) by 878 days.

(21) Appl. No.: 11/569,882

(22) PCT Filed: May 30, 2005

(86) PCT No.: PCT/JP2005/009854

§ 371 (c)(1),
(2), (4) Date: Dec. 1, 2006

(87) PCT Pub. No.: WO2005/119092

PCT Pub. Date: Dec. 15, 2005

(65) Prior Publication Data

US 2009/0205933 A1 Aug. 20, 2009

(30) Foreign Application Priority Data

Jun. 2, 2004 (JP) ............... 2004-165162
Sep. 21, 2004 (JP) ............... 2004-272796

(51) Int. Cl.
*B65H 23/198* (2006.01)
(52) U.S. Cl. ................. 318/6; 318/9; 318/280
(58) Field of Classification Search .......... 318/6, 318/9, 280, 39, 85, 255; 198/618; 271/225
See application file for complete search history.

(56) References Cited

U.S. PATENT DOCUMENTS 4,280,669 A * 7/1981 Leanna et al. ............ 242/527.1

* cited by examiner

*Primary Examiner*—Karen Masih
(74) *Attorney, Agent, or Firm*—Pearne & Gordon LLP

(57) ABSTRACT

A feeder to be able to meet the requirements of positioning accuracy, long distance conveyance, remote conveyance, controllability, high precision feeding, high speed feeding, inexpensiveness, simplicity of construction, space saving, weight reduction, measure for dusting and safety for accident for being provided for multiple utilizations. This feeder comprises a forward winder (21), a reverse winder (31), a forwardly winding liner body (51), a reversely winding liner body (61) and a reciprocating body (71). The forwardly winding linear body and the reversely winding linear body are connected to the reciprocating body. The forward winder on winding rotation and the reverse winder on rewinding rotation rotate in synchronism and phase with each other in the same or reverse direction. The amount of winding the forwardly winding linear body by the forward winder and the amount of rewinding the reversely winding linear body by the reverse winder are equal to each other. The amount of rewinding the forwardly winding linear body by the forward winder and the amount of winding the reversely winding linear body by the reverse winder are equal to each other.

11 Claims, 8 Drawing Sheets

FEEDER

TECHNICAL FIELD

This invention relates to a feeder for reciprocating a reciprocating body, which belongs to a mechanical field.

BACKGROUND OF TECHNOLOGY

As well-known, many industrial machines and instruments include a feeder to feed a part or all of bodies of them. The feeder is also called a conveyor system or a reciprocating apparatus. As a typical example of them, machine tools etc. are equipped with a feeder for conveying-in work pieces to a working position and conveying-out them out of the working position. Otherwise, there are feeders for supplying raw materials or for conveying-in parts to be assembled to an assembling position and conveying-out the assembled parts out of the assembling position. Thus, the feeders in the mechanical field have been used over a wide range.

There have been various feeders such as a belt-conveyor, a screw type feeder, a cylinder type feeder, a timing belt feeder, a robot or the likes for generally widely known feeders. The particulars of these feeders are as follows;

(Belt Conveyor)

This is adapted to mount conveyance things onto a belt and move the belt by pulleys so as to convey the conveyance things in a continuous manner. This conveying means is most generally used.

(Screw Type Feeder)

This uses a screw such as a trapezoidal screw or a ball screw. This is adapted to mount the conveyance things onto a reciprocating body and feed it by means of the screw thrust. In case of a high precision apparatus, the feeder uses the ball screw as the screw and a servomotor as a power source.

(Cylinder Type Feeder)

This uses an oil pressure system cylinder or a pneumatic cylinder. This is adapted to mount the conveyance things onto the reciprocating body and feed it by means of a force of a piston sliding in a cylinder.

(Timing Belt Type Feeder)

This is adapted to mount the conveyance things onto a timing belt (toothed belt) and move it by toothed pulleys so as to convey them in a continuous manner. This can accomplish the conveyance more precious than the belt conveyor.

(Robot)

This is provided with robot hands having higher operativity such as grasping, moving, releasing (putting) and others. This can have flexibility of directions of conveyance such as upward and downward, rightward and leftward, forward and rearward and rotational direction etc. Many joints can finely control the movement of the robot hands.

Patent Document 1: JP2002-340127
    Patent Document 2: JP2002-372119
    Patent Document 3: JP2003-311562

The belt conveyor among the aforementioned feeders is inexpensive and suitable for long distance conveyance, but has a poor precision of positioning the conveyance things and a feeding velocity later than the other feeders. In addition thereto, the belt conveyor requires a large installation space proportional to the conveyance distance. The screw type feeder has the higher precision of conveyance because of the use of the polish ball screw and enables the conveyance at middle or high velocity. However, the expensive polish ball screw would cause the apparatus to get also expensive. The screw type feeder is not of space-saving type and also has a shorter conveyance distance, which makes the long distance conveyance difficult. The cylinder type feeder also has the difficulty of long distance conveyance and the problem of expensiveness in the same manner as the screw type feeder. Thus, this cannot accomplish the compactness, which is required for the space saving. Particularly, the cylinder type feeder has the practical problem in which it is difficult to arbitrarily change the conveyance stroke. On the other hand, the timing belt type feeder is more inexpensive than the screw type feeder using the polish ball screw, but gets more expensive than the belt conveyor if it employs highly precious parts in order to expect the high precision of positioning. In addition thereto, the timing belt type feeder can set the conveyance distance longer than the screw type feeder or the cylinder type feeder, but cannot maintain the conveyance distance identical to that of the belt conveyor due to the restrictions on manufacture or the looseness of the belt. Thus, the timing belt type feeder has the shorter conveyance distance than the belt conveyor even though the former is less elongated than the latter. On the other hand, the robot is too expensive even though it has the considerably high precision and functions. In addition thereto, the robot is not suitable for continuous and long distance conveyance.

As apparent from the foregoing, the conventional feeders have merits and demerits. There has been not developed an advantageous and useful feeder having merits collected.

Describing the conventional feeders such as the aforementioned ball screw type feeder and the timing belt type feeder in more details, these feeders have an unavoidable occurrence of fine dust (dust of μm unit or less) caused by friction between the parts of the drive system. There are the fields in which the fine dust is not regarded as questionable and the fields in which the fine dust should be excluded. The fields requiring an extra-high cleanness among the latter fields are the ones of manufacture of liquid-crystal boards and semiconductors.

In order to avoid the occurrence of the fine dust, there have been employed means to heighten an abrasion resistance of the parts or to use grease for reducing the occurrence of the fine dust. Regarding the apparatus, there have been developed a linear servo-actuator having little fine dust occurrence portion as a non-contact power source having electromagnetism power employed. If these means are totally used, predetermined clean atmosphere can be held in the fields of manufacture requiring the extra-high cleanness. However, the linear servo-actuator is too expensive even though it has means good for avoiding the occurrence of fine dust. Therefore, it has been expected to develop means to be able to maintain the cleanness having the same degree as the linear servo-actuator or higher and also to be able to more highly reduce the cost in comparison with the linear servo-actuator.

The technique for reducing the occurrence of the fine dust for the feeder desirably expects all possible measures by multiple means. Since it can improve the yields of the products and reduce the cost for treating the default goods, it will totally improve the economical efficiency.

The precision working apparatus essentially requires the highly precise conveyance as apparent. Therefore, it is an important problem to meet the highly precise conveyance according to its use.

With respect to the feeders, it is also important to maintain the safety and prevent secondary damages by detecting unexpected accidents, which would possibly occur.

It is an object of the invention to provide a feeder to be able to meet the requirements of positioning accuracy, long distance conveyance, remote conveyance, controllability, high precision feeding, high speed feeding, inexpensiveness, simplicity of construction, space saving, weight reduction, measure for dusting and safety for accident.

DISCLOSURE OF THE INVENTION

A feeder according to a fundamental form of the invention comprises a forward winder which can rotate forwardly and reversely, a reverse winder which can rotate forwardly and reversely, a forwardly winding liner body to be wound and rewound through the forward winder, a reversely winding liner body to be wound and rewound through the reverse winder and a reciprocating body to forwardly and reversely move by means of guide means when it is subject to a forward force or a reverse force and wherein the forwardly winding linear body to be held so as to be wound and rewound by the forward winder and the reversely winding linear body to be held so as to be wound and rewound by the reverse winder are connected to the reciprocating body, the forward winder on winding rotation and the reverse winder on rewinding rotation rotate in synchronism and phase with each other in the winding and rewinding directions, respectively, the forward winder on rewinding rotation and the reverse winder on winding rotation rotate in synchronism and phase with each other in the rewinding and winding directions, respectively, the amount of winding the forwardly winding linear body by the forward winder and the amount of rewinding the reversely winding linear body by the reverse winder are equal to each other and the amount of rewinding the forwardly winding linear body by the forward winder and the amount of winding the reversely winding linear body by the reverse winder are equal to each other.

In the aforementioned form of the invention, the forward and reverse winders may be integrated with each other in a co-axial manner or may be independently provided.

The forward and reverse winder on winding rotation may desirably move in an axial direction corresponding to the winding pitch of the linear bodies.

A portion of the forwardly winding linear body may be secured to a winding drum of the forward winder while a portion of the reversely winding linear body may be secured to a winding drum of the reverse winder.

In the aforementioned form of the invention, a friction occurrence portion may be covered with a dust cover. In this case, a suction machine may be desirably connected to the dust cover for sucking air from the inside of the dust cover. The forwardly and/or reversely winding linear bodies may pass through the duct cover in a non-contact state.

Furthermore, in the aforementioned form of the invention, the reciprocating body may be supported in a reciprocating manner through non-contact guide means.

The feeder according to the aforementioned fundamental form of the invention may be preferably provided with scale feedback means comprising a linear scale to indicate the distance of movement of the reciprocating body, a non-contact detection head to read the position of the reciprocating body corresponding to the linear scale and a controller to input a feedback signal to motors for the forward and reverse winders, respectively when the detection signal is received from the detection head, and wherein the linear scale is provided along the longitudinal direction of the guide means, the detection head is installed on the reciprocating body and the detection head is connected to the controller.

The feeder according to the aforementioned fundamental form of the invention may be preferably provided with a disconnection detector for detecting a disconnection of the forwardly winding linear body and/or the reversely winding linear body corresponding to the forwardly winding linear body and/or the reversely winding linear body and provided in the movement area of the reciprocating body with a brake for stopping the reciprocating body when the disconnection of the forwardly winding linear body and/or the reversely winding linear body occurs and wherein the brake for receiving the disconnection detection signal from the disconnection detector when the disconnection occurs is adapted to stop the reciprocating body and an electric power source for the motors for the forward winder and/or the reverse winder is cut in synchronism with this.

The feeder of the invention can accomplish the following effects.

(1) The forward direction and the reverse direction of the reciprocating body can be accurately assured. In addition thereto, the forward and reverse movement of the reciprocating body can be accurately performed because the "rewinding" or "winding" of the forwardly winding linear body by the forward winder and the "winding" or "rewinding" of the reversely winding linear body by the reverse winder synchronize with each other. Thus, the high positioning accuracy of the reciprocating body on the forward and reverse movement can be obtained.

(2) The long distance conveyance by the reciprocating body can be simply accomplished only by elongating the both of the forwardly and reversely winding linear bodies and the guide means.

(3) The remote operation of the reciprocating body can be accomplished by elongating the forwardly and reversely winding linear bodies even when the reciprocating body is set at a place far away from the forward and reverse winders. Thus, the remote operation of the reciprocating body can be simply realized when the reciprocating body is at the remote place.

(4) The distance of forward and reverse movement (amount of feeding or backing) of the reciprocating body is determined on the amount of rotation of the forward and reverse winders. That is, since the feeding and backing distances can be controlled by the amount of rotation of the forward and reverse winders, the good controllability can be obtained.

(5) The reciprocating body can be enough to be small-sized and the main linear bodies can have an extremely light weight. Since this means that the inertia moment when the reciprocating body forwardly or reversely moves is low, the high speed feeding can be obtained.

(6) Since the two main linear bodies for enabling the long distance and the remote conveyance are simply an elongated body, they are remarkably cheaper than a main member of other conveyor means. Thus, the apparatus can be provided with a lower price.

(7) The reciprocating body reciprocates in a predetermined direction so long as it has guide means. Since what is necessary is just to connect this reciprocating body to the linear bodies of the forward and reward winders, the construction can be simplified.

(8) The two linear bodies which are only long and have no bulky on structure can be associated with the forward and reverse winders and the reciprocating body while using a very small space. Thus, the space saving can be accomplished.

(9) The forwardly winding linear body and the reversely winding linear body themselves have light weight. Thus, an appropriate weight saving can be accomplished.

(10) Since this mechanism has a main action of winding and rewinding the linear bodies by the forward and reverse winders, it provides no dust due to friction and therefore it can be suitably used in such a filed as the extra-high cleanness is required.

(11) Since the places where friction occurs and therefore dust is generated are covered with the dust covers, the generated dust is never scattered around the neighborhood. Thus, the cleanness can be furthermore improved.

(12) Since scattering the dust can be more positively prevented by positively sucking the dust cover by a suction machine and collecting the dust, the neighborhood atmosphere can have the higher cleanness.

(13) As the forwardly and reversely winding linear bodies pass through the dust cover in a non-contact manner, the linear bodies can be more easily associated with the winders and although the places where dust is generated don't require the covers more than necessary, the poor economy can be avoided.

(14) As the reciprocating body is supported through the non-contact type guide means in a reciprocate manner, there occurs no cause of generation of the dust. Thus, this contributes also to the maintenance of the extra-high cleanness.

(15) With the scale feedback means provided, the feeding amount (the feeding distance) of the reciprocating body can be controlled with high precision.

(16) As the reciprocating body stops by the brake when the disconnection of the forwardly and reversely winding linear bodies is detected by the disconnection detector, the reciprocating body can stop immediately for safety maintenance and the occurrence of the secondary damage due to the riot of the linear bodies or can be prevented when the disconnection accidents occur due to unexpected situation.

BEST MODE OF EMBODIMENT OF INVENTION

Some forms of embodiment of the invention will be described with reference to the attached drawings.

Figure 1:
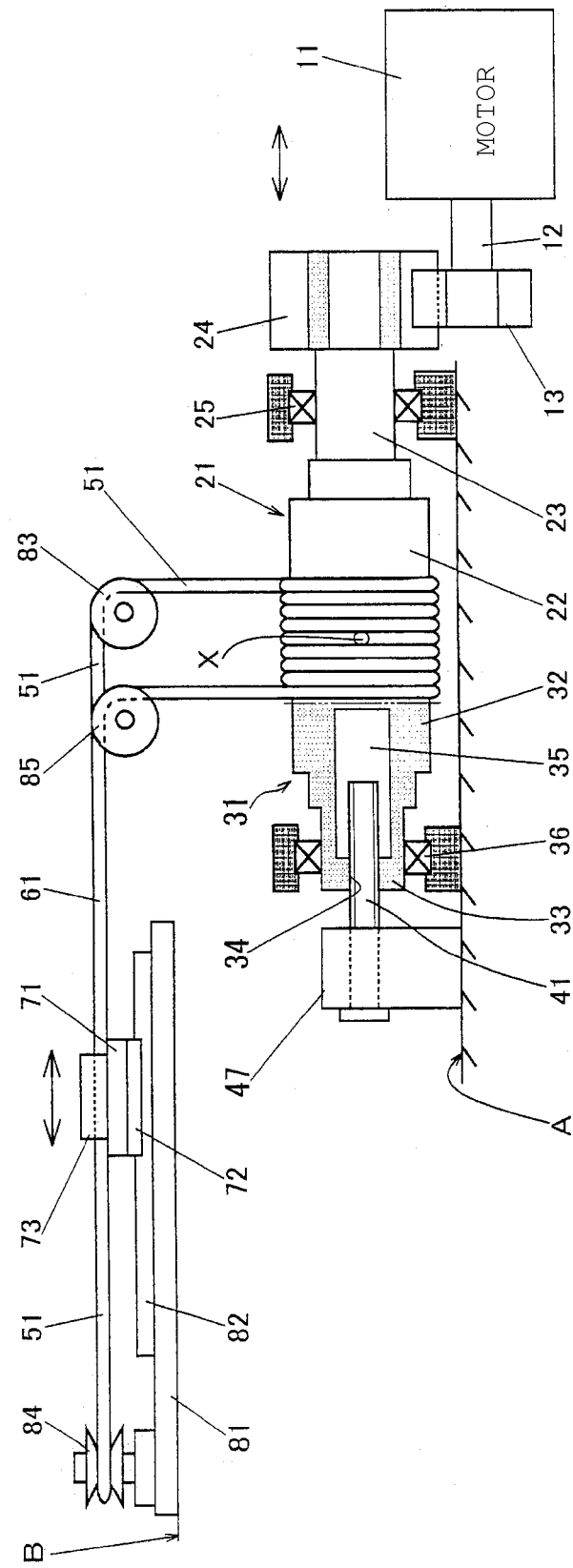
FIG. 1 is a front view of a feeder constructed in accordance with a first form of embodiment of the invention and illustrated briefly in the state where portions thereof are broken away.

In the form of embodiment of FIG. 1, the reference numeral 11 designates a motor, the reference numeral 21 designates a forward winder, the reference numeral 31 designates a reverse winder, the reference numeral 41 designates a screw shaft, the reference numeral 51 designates a forwardly winding linear body, the reference numeral 61 designates a reversely winding linear body and the reference numeral 71 designates a reciprocating body.

The motor 11 illustrated in FIG. 1 may comprise a conventional or well-known servo-motor or pulse motor. A gear (a pinion) 13 is attached onto an output shaft 12 of the motor 11. This motor 11 may be disposed at a portion of an installation area A in FIG. 1 and be securely supported by well-known means.

The forward winder 21 and the reverse winder 31 shown in FIG. 1 may be formed of materials of excellent mechanical properties such as metal, synthetic resin, composite materials, etc. The forward winder 21 has a longitudinally long winding drum 22 of circular section. The winding drum 22 of the forward winder 21 has a pivotal shaft 23 protruding from an outer end face of the winding drum 22 and a gear 24 provided on the peripheral face of the pivotal shaft 23 at its end. The reverse winder 31 also has a longitudinally long winding drum 32 of circular section. The winding drum 32 of the reverse winder 31 has a pivotal shaft 33 protruding from an outer end face of the winding drum 32. The reverse winder 31 has a threaded hole 34 and a space 35 formed in the axial core of the pivotal shaft 33. The threaded hole 34 and the space 35 communicate with each other. In FIG. 1, the thus constructed forward and reverse winders 21 and 31 are integrated with each other. In other words, the winding drum 22 of the forward winder 21 and the winding drum 32 of the reverse winder 31 are linearly integrated with each other so that the former is disposed on the right side and the latter is disposed on the left side.

The integrated body of the forward and reverse winders 21 and 31 at both ends thereof are supported so that they can rotate and reciprocate in an axial direction in the installation area A of FIG. 1. More particularly, the integrated body is supported by a bearing member 25 to support the pivotal shaft 23 so that it can rotate and slide and a bearing member 36 to support the pivotal shaft 33 so that it can rotate and slide on the installation area A. In this form of embodiment, the gear 24 on the side of the pivotal shaft 23 and the gear 13 on the side of the motor output shaft 12 are meshed with each other. As noted from FIG. 1, the width of the gear 24 is larger than that of the gear 13.

The threaded shaft 41 of FIG. 1 has threaded grooves formed on its peripheral face. The materials of the threaded shaft 41 are identical to those of the forward and reverse winders 21 and 31.

The threaded shaft 41 of FIG. 1 is disposed adjacent to the reverse winder 31 on the installation area A and securely supported in a horizontal manner by a bearing stand 42. The leading end of the threaded shaft 41 is threaded into the threaded hole 34 and enters the space 35.

Both of the forwardly and reversely winding linear bodies 51 and 61 may comprise a tough elongated body. Those linear bodies may be formed of materials of arbitrary diameter such as finely thin body like a thread or thick body like a rope. From the point of practical view, the linear bodies 51 and 61 of small diameter are desirable so long as the strength can be maintained. The linear bodies 51 and 61 have flexibility, but no substantial elasticity due to its tensile strength. The concrete materials of the linear bodies 51 and 61 may be metal, synthetic resin and composite materials of them. They may be formed of a plural of single yarns or wires twisted. The linear bodies 51 and 61 illustrated in FIG. 1 are connected into a single body and have an endless form.

In FIG. 1, the forwardly winding linear body 51 is wound on the winding drum 22 of the forward winder 21 while the reverse winding linear body 61 is wound on the winding drum 32 of the reverse winder 31. These linear bodies 51 and 61 are connected to the reciprocating body 71 described later through rotation wheels. When they are to be wound on the winding drums 22 and 32, the linear bodies 51 and 61 of FIG. 1 are spirally wound on and over both of the winding drums 22 and 32 because they are connected in series. More particularly, the linear bodies 51 and 61 are wound so that the winding amount of the forwardly winding linear body 51 onto the winding drum 22 and the winding amount of the reversely winding linear body 61 onto the winding drum 32 are equal to each other. In this case, the boundary portion of the linear bodies 51 and 61 becomes a fixture portion X of the linear bodies 51 and 61 onto the winding drums 22 and 32. Thus, the fixture portion X is fixed to the boundary portion of the winding drums 22 and 32. This fixture means may be arbitrary unless the fixture portions X moves, but the concrete examples thereof are as follows. For one example, a hole like a ring may be provided at the boundary portion of the winding drums 22 and 32 and the fixture portion X passes through the hole and bound onto the boundary portion. For another example, a recess may be provided in the boundary portion of the winding drums 22 and 32 and the fixture portion X is engaged in the recess and thereafter secured to the boundary portion by forcibly inserting a fixture device (an escape stopping plug). For further example, with a through-hole provided in the boundary portion of the cylindrical winding drums 22 and 32, the fixture portion X is inserted through the through-hole into the boundary portion of the winding drums 22 and 32 and secured to the boundary portion by applying the securing or escape preventing device onto the boundary portion. For further example, a tightening or inserting clamp may be provided on the boundary portion of the winding drums 22 and 32 and the fixture portion X may be secured to the boundary portion by the clamp. For example other than the aforementioned means, the fixture portion X may be secured to the boundary portion of the winding drums 22 and 32 by adhesion means (including welding means in case that the linear bodies are of metal). The fixture portion X may be secured by combination of adhesion means and other means.

The reciprocating body 71 itself briefly shown in FIG. 1 may be a working machinery instrument, a conveying device or a portion of a working robot. In FIG. 1, the reciprocating body 71 is provided with a traveling member 72 and a grasping member 73 for clamping the linear bodies. The traveling member 72 may be a traveling bearing, for example and the grasping member 73 may be one serving to grasp the linear bodies and tightly holding them.

The reciprocating body 71 is installed on the working area B for performing the predetermined operation. On the working area B is provided a base 81 on which guide means 82 (guide rails, for example) may be provided corresponding to the traveling member 72. Thus, the reciprocating body 71 is installed through the traveling member 72 on the guide means 82 on the base 81 and can reciprocate along the longitudinal; direction of the guide means 82. The forwardly and reversely winding linear bodies 51 and 61 are connected to the thus installed reciprocating body 71 and rotating wheels 83 through 85 such as pulleys or sheaves may be disposed for maintaining the connection. The direction converting rotation wheels 83 and 85 are disposed between the installation area A and the working area B and the idling rotation wheel 84 is disposed on the base 81.

In FIG. 1, the forwardly and reversely winding linear bodies 51 and 61 are associated with the reciprocating body 71 as follows. With respect to the forwardly winding linear body 51, the portion of the forwardly winding linear body 51 rewound from the winding drum 22 of the forward winder 21 reaches the rotation wheel 84 on the base 81 through the middle rotation wheel 83 and is returned to the grasping member 73 of the reciprocating body 71. The fixture portion of the linear bodies 51 and 61 reaching the grasping member 73 is connected to each other in series and therefore the linear bodies 51 and 61 and the reciprocating body 71 are associated with each other by inserting the fixture portion into and tightening to the grasping member 73.

In the feeder of the invention illustrated in FIG. 1, when the output shaft 12 of the motor 11 rotates in a clockwise direction, the rotation is transferred to the forward and reverse winders 21 and 31 through the gears 13 and 24 and therefore the winders 21 and 31 rotate in a counterclockwise direction. In this case, since the forward and reverse winders 21 and 31 are integrated with each other having the winding drum diameters equal to each other, the winders 21 and 31 can be regarded to rotate in the same direction and in synchronism and phase with each other while having the same winding drum diameter. In view of the relationship between "the forward and reverse winders 21 and 31" and "the forwardly and reversely winding linear bodies 51 and 61", since the forwardly winding linear body 51 is rewound from the forward winder 21 and at the same time the reversely winding linear body 61 is wound on the reverse winder 31, the operations of the linear bodies 51 and 61 get reverse. As apparent from the foregoing, the amount of rewinding the forwardly winding linear body 51 and the amount of winding the reversely winding linear body 61 are equal to each other. In this manner, as the forwardly winding linear body 51 is rewound and at the same time the reversely winding linear body 61 is wound, the reciprocating body 71 in the state of being associated with the linear bodies 51 and 61 moves through the grasping member 73 in the rightward direction of FIG. 1 while guided by the guide means 82. In other words, the reciprocating body 71 is fed in the rightward direction of FIG. 1. When the output shaft 12 of the motor 11 rotates in a counterclockwise direction, the reverse operation occurs. More particularly, the forwardly winding linear body 51 is wound on the forward winder 21 and at the same time the reversely winding linear body 61 is rewound from the reverse winder 31. At this time, the amount of winding the forwardly winding linear body 51 and the amount of rewinding the reversely winding linear body 61 are equal to each other. Therefore, the reciprocating body 71 is fed in the leftward direction of FIG. 1. Thus, the reciprocating body 71 moves in the leftward direction of FIG. 1 while guided by the guide means 82.

As aforementioned, in the state where the forward and reverse winders 21 and 31 are operating so as to feed the reciprocating body 71, since the non-rotating screw shaft 41 is threaded into the threaded hole 34, the forward and reverse winders 21 and 31 shift in the axial direction in accordance with the winding and rewinding pitches of the linear bodies 51 and 61. In this case, the winding pitch of the forward winding linear body 51 is regarded to be equal to the diameter of the linear body 51 if it is closely spirally wound. If it is roughly spirally wound so that a gap is formed between the adjacent coils, the winding pitch of the forwardly winding linear body 51 corresponds to the one in which the gap distance is added to the diameter of the linear body 51. The rewinding pitch of the forwardly winding linear body 51 is identical to the winding pitch thereof. The rewinding and rewinding pitches of the reversely winding linear body 61 are equal to the winding pitch of the forwardly winding linear body 51. If the forward and reverse winders 21 and 31 rotate in the counterclockwise direction, those winders 21 and 31 shift in the rightward direction as viewed in FIG. 1 with the pitch equal to the diameters of the linear bodies 51 and 61. Reversely, if the forward and reverse winders 21 and 31 rotate in the clockwise direction, those winders 21 and 31 shift in the leftward direction with the aforementioned pitch. Therefore, both of the linear bodies 51 and 61 are spirally wound on and rewound from the winding drums 22 and 32 in an orderly manner.

In the form of embodiment of FIG. 1, the forward and reverse winders 21 and 31 and the forwardly and reversely winding linear bodies 51 and 61 are just named with the relative relationship. Therefore, the forward and reverse winders 31 and 21 and the forwardly and reversely winding linear bodies 61 and 51 may be renamed without any substantial change. In the form of embodiment of FIG. 1, although the linear bodies 21 and 31 are indicated in an excessively large manner and the reciprocating body 71 is indicated in an excessively small manner for convenience of explanation, it will be understood that they can operate without any inconsistency. In the form of embodiment of FIG. 1, when the reciprocating body 71 should be fed in the forward and rearward direction or in the leftward and rightward direction, the guide means 82 should be disposed in a horizontal manner, but when the reciprocating body 71 should be fed in the vertical direction, the guide means 82 should be held in a vertical manner, and when the reciprocating body 71 should be fed in the inclination direction, the guide means 82 should be held in an inclined manner. In FIG. 1, since the forwardly and reversely winding linear bodies 51 and 61 are in series, when these linear bodies are to be connected to the reciprocating body 71, the boundary portion of the linear bodies 51 and 61 is not required to be secured to the fixture member 73. More particularly, even in case where the forwardly winding linear body 51 is secured by the grasping member 73 or the reversely winding linear body 61 is secured by the grasping member 73, the opposite linear body will be indirectly connected to the reciprocating body 71. The forward and reverse winders 21 and 31 desirably have spiral grooves of recessed type (of circular cross section or of V-shaped cross section, for example) formed in the winding drums 22 and 32 thereof. In this case, the linear bodies can be stably wound and rewound in an orderly manner. The distance between the installment area A and the operation area B of FIG. 1 generally varies on the forms of embodiment. If the distance between A and B is longer, then the linear bodies 51 and 61 are longer and the number of the rotation wheels 83 and 84 increases. If the distance between A and B is shorter, then the linear bodies 51 and 61 are shorter and the number of the rotation wheels 83 and 84 decreases. If the linear bodies 51 and 61 are possibly removed from the rotation wheels 83 and 84 or if they are possibly slackened, a removal stopper (a stopper roller, for example) or a tension applier (a tension roller, for example) may be applied to the linear bodies 51 and 61. In the form of embodiment of FIG. 1, the transmission system for the motor 11 and the forward and reverse winders 21 and 31 may be gears 13 and 24. In this case, if the rotational directions of the motor 11 and the forward and reverse winders 21 and 31 are different from each other, the number of the gears is apparently an even number (in the illustrated example) and if the rotational directions of them are identical to each other, the number of the gears is an odd number. The power transmission system for the motor 11 and the forward and reverse winders 21 and 31 may be a belt transmission system such as a V-belt, a timing belt or the like or a chain transmission system. The power transmission system for the motor 11 and the forward and reverse winders 21 and 31 may have a clutch interposed so as to arbitrarily disconnect or connect the power transmission.

If the aforementioned forward and reverse winders 21 and 31 should be of a separate type, two sets of an integral body of the forward and reverse winders and associated parts thereof may be prepared, one set of which may be of the forward winder 21 and its associated parts and the other set of which may be of the reverse winder 31 and its associated parts. In this case, the rewound end of the forwardly winding linear body 51 wound on the forward winder 21 may be connected through the rotation wheels to the reciprocating body 71 and the rewound end of the reversely winding linear body 61 wound on the reverse winder 31 may be connected through the rotation wheels to the reciprocating body 71. In the form of embodiment in which the forward and reverse winders 21 and 31 are of separate type, the winders 21 and 31 may rotate in the same direction in synchronism and phase with each other, for one example or they may rotate in the reverse direction in synchronism and phase with each other, for another example. In other words, the forward and reverse winders of separate type may rotate either in the same direction or in the reverse direction.

In the form of embodiment in which the forward and reverse winders 21 and 31 are of separate type, in case where the winding drum 22 of the forward winder 21 and the winding drum 32 of the reverse winder 31 have the diameter different from each other, that is in case the ratio of the diameter of them is 1 to 2, for example, the number of rotation of the small winding drum should rotate as twice as the revolution of the large winding drum. In other words, even though the diameters of the winding drums 22 and 32 are different from each other, they may be used by making the peripheral velocity of them (the peripheral velocity of the winding drums) equal to each other.

Figure 2:
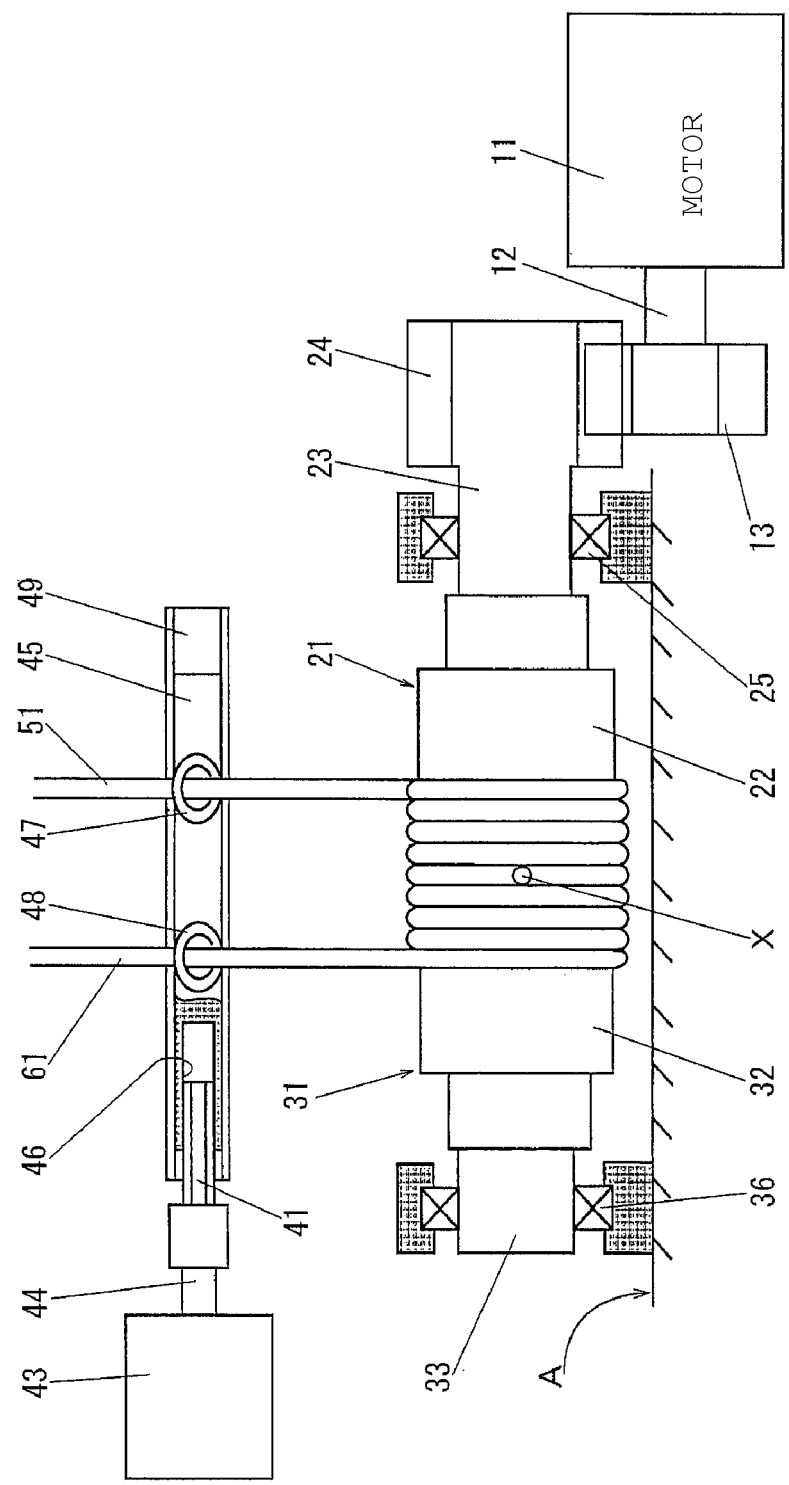
FIG. 2 is a front view of a feature of a feeder constructed in accordance with a second form of embodiment of the invention and illustrated briefly.

In the form of embodiment of FIG. 2, there are provided independent from each other the shift means for spirally winding the forwardly and reversely winding linear bodies 5 and 61 on the winding drums 22 and 32 of the forwardly and reversely winders 21 and 31 in a close and orderly manner. This will be described in details later.

In FIG. 2, the reference numeral 41 designates a screw shaft, the reference numeral 43 designates a conventional electric motor (motor) and the reference numeral 45 designates a shift member. The screw shaft 41 is of the same as the aforementioned one. The motor 43 has an output shaft 44. The screw shaft 41 is connected through a conventional coupling to the output shaft 44 of the motor 43. The shift member 45, which may be formed of metal or synthetic resin has a threaded hole 46 formed from one end thereof toward the center inside and two ring-like pass-through portions 47 and 48 provided on its front face. A long rail member 49 for holding the shift member 45 may be formed of metal or synthetic resin and has a groove type opening on its front face.

In FIG. 2, the rail member 49 is disposed on the forward and reverse winders 21 and 31 in a horizontal manner and held in this state by not shown attachment means. The shift member 45 is fitted into the rail member 49 so as to reciprocate along the longitudinal direction without any rotation. The screw shaft 41 is rotationally threaded into the threaded hole 46 in the shift member 45. In such a construction, the forwardly winding linear body 51 rewound from the winding drum 22 of the forward winder 21 passes through the pass-through opening 47 of the shift member 45 and the reversely winding linear body 61 rewound from the winding drum 32 of the reverse winder 31 passes through the pass-through opening 48 of the shift member 45. As understood from the foregoing explanation, in the form of embodiment of FIG. 2, the forward and reverse winders 21 and 31 never move in an axial direction. The not explained matters of the form of embodiment of FIG. 2 are substantially or closely identical to those of the form of embodiment of FIG. 1. Also, the already described matters may be applied to the form of embodiment of FIG. 2 within the range of compatibility.

In the form of embodiment of FIG. 2, the reciprocating body 71 can be fed by rewinding and winding the linear bodies 51 and 61 by forward and reverse rotation of the forward and reverse winders 21 and 31. At that time, the screw shaft 41 rotates forwardly or reversely through the motor 43. When the screw shaft 41 rotates forwardly, the shift member 45 shifts in the leftward direction of FIG. 2 while it is guided by the rail member 49 and the screw shaft 41 rotates reversely, the shift member 45 shifts in the rightward direction of FIG. 2. The shift member 45 shifts with a pitch equal to the diameter of the linear bodies 51 and 61. Thus, the linear bodies 51 and 61 held by the shift member 45 through the pass-though portions 47 and 48 are wound on the winding drums 22 and 32 of the winders 21 and 31 in a close and orderly manner and rewound from the winders 21 and 31 in an orderly manner.

Figure 3:
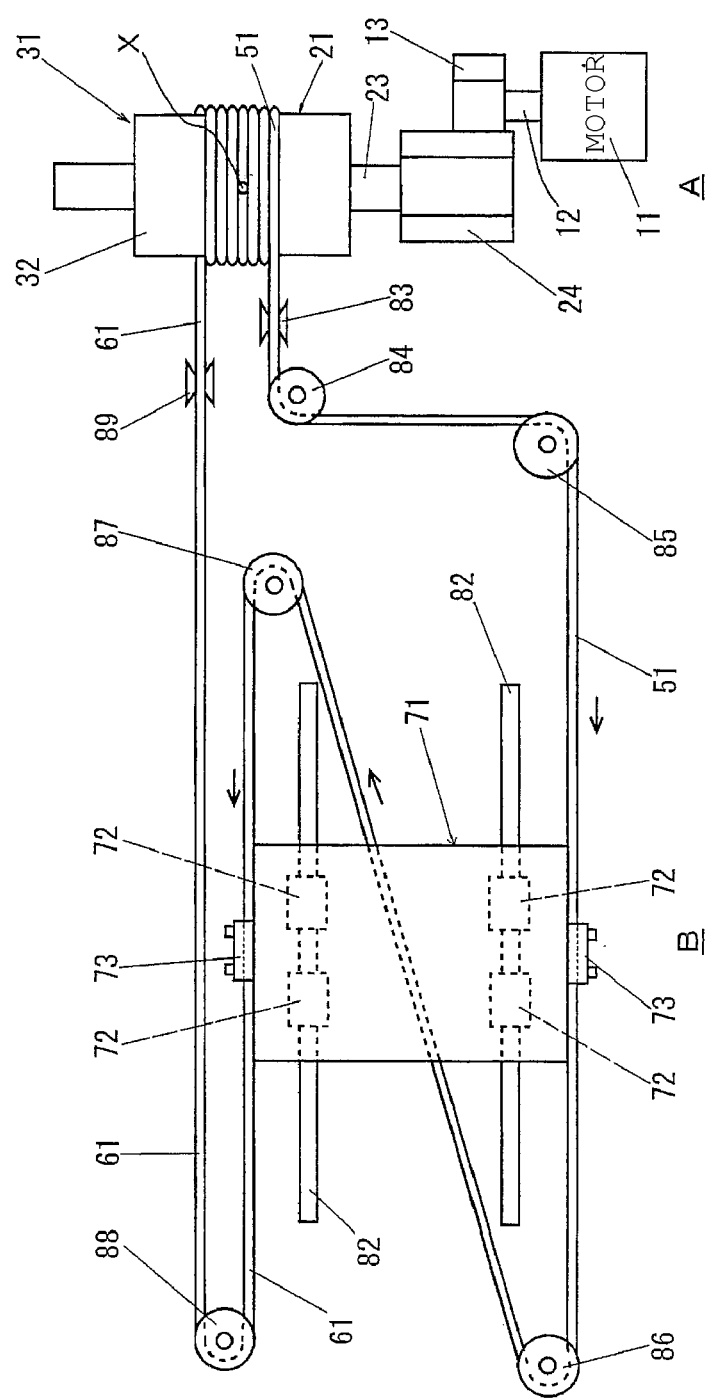
FIG. 3 is a front view of a feeder constructed in accordance with a third form of embodiment of the invention and illustrated briefly.

In the form of embodiment of FIG. 3, the reciprocating body 71 is large-sized. This will be explained later.

On the operation area of FIG. 3 are provided two guide means 82 in parallel to each other. A back face of the reciprocating body 71 is provided with a plural of traveling members 72 corresponding to the two guide means 82. The reciprocating body 71 is also provided with fixture members 73 at two edges thereof parallel to the guide means 82. The number of the rotation wheels 83 through 89 disposed on the installation area A and the operation area B increases in comparison with the former forms of embodiment.

In the form of embodiment of FIG. 3, the reciprocating body 71 is mounted on the two guide means 82 through the traveling members 72 so that it can travel thereon. The rewound end of the forwardly winding linear body 51 is connected to the reciprocating body 71 through one of the fixture members 73 on the one edge of the reciprocating body 71. In other words, the rewound end of the forwardly winding linear body 51 is rewound from the winding drum 22 of the forward winder 21, passes around the rotation wheels 83, 84 and 85 until it reaches the fixture member 73 and then moves around the rotation wheel 86. The rewound end of the reversely winding linear body 61 is connected to the reciprocating body 71 through the other fixture member 73 on the other edge of the reciprocating body 71. In other words, the rewound end of the reversely winding linear body 61 is rewound from the winding drum 32 of the reverse winder 31, passes around the rotation wheels 89 and 88 until it reaches the other fixture member 73 and then moves around the rotation wheel 87. In this case, the portions of the linear bodies around one of the fixture members 73 and the rotation wheel 86 and 87 and another of the fixture members 73 may be the forwardly linear body 51, the reversely winding linear body 61 and the common portion of them. This linear body portion may be omitted. In such a case, the rotation wheels 86 and 87 may be omitted. The not explained matters of the form of embodiment of FIG. 3 are substantially or closely identical to those of the form of embodiment of FIG. 1. Also, the already described matters may be applied to the form of embodiment of FIG. 3 within the range of compatibility.

In the form of embodiment of FIG. 3, the reciprocating body 71 can be fed by rewinding and winding the linear bodies 51 and 61 by forward and reverse rotation of the forward and reverse winders 21 and 31, which is made by the forward and reverse rotation of the motor 11. Since the feeding force is applied to the reciprocating body 71 in the state where the linear bodies 51 and 61 are secured to a plural of portions of the reciprocating body 71, every portion has no trouble produced even though the reciprocating body 71 has a heavy weight.

Figure 4:
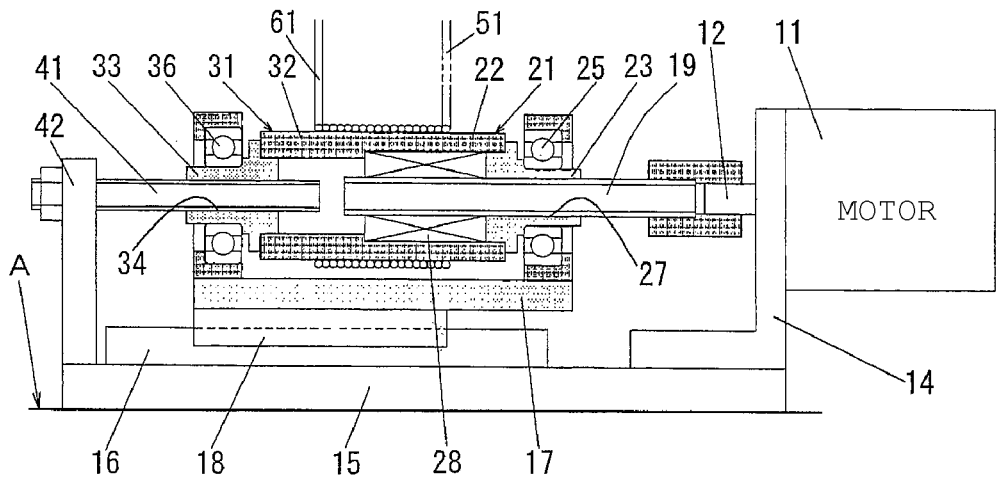
FIG. 4 is a front view of a feeder constructed in accordance with a fourth form of embodiment of the invention and illustrated briefly in a state where a feature thereof is longitudinally sectioned.

In the form of embodiment of FIG. 4, the mechanism installed on the installation area A is unitized in the form partially different from the aforementioned forms of embodiment. This will be explained later.

On a base 15 of FIG. 4 are attached an instrument stand 14 on one side, a bearing stand 42 on the opposite side and a rail type guide stand 16 at the middle. A movable stand 17 of FIG. 4 on its lower face is provided with a traveling member 18, through which the movable stand 17 is mounted on the guide stand 16 so that it can travel thereon.

In FIG. 4, the cylindrical integral body of the forward and reverse winders 21 and 31 is provided with the pivotal shaft 23 for the forward winder 21 and the pivotal shaft 33 for the reverse winder 31. The axial portion of the pivotal shaft 23 has the through-hole 27 formed therein and the axial portion of the pivotal shaft 33 has the already mentioned threaded hole 34 formed therein. A spline cylinder 28 having spline grooves formed in the inner periphery thereof fitted into the integral body in a coaxial manner. A spline shaft 19 is engaged into the spline cylinder 28 in a spline fitting manner. Although the spline shaft 19 and the spline cylinder 28 move relative to each other in an axial direction, they integrally rotate in the peripheral direction by those meshed with each other.

In FIG. 4, the integral body of the forward and reverse winders 21 and 31 provided with the spline shaft 19, the spline cylinder 28 and other components is rotatably supported on the movable stand 17 through the bearings 25 and 36 on both sides thereof. More particularly, the integral body is rotatably assembled on the movable stand 17 by supporting the pivotal shafts 23 and 33 by the bearings 25 and 36. The motor 11 is mounted on the base 15 through the instrument stand 14 and the output shaft 12 of the motor 11 and the spline shaft 19 are connected by a conventional coupling. The screw shaft 41 securely supported on the bearing stand 42 in a non-rotational manner is engaged into the threaded hole 34 in the pivotal shaft 33 for the reverse winder 33. The not explained matters of the form of embodiment of FIG. 4 are substantially or closely identical to those of the form of embodiment of FIG. 1. Also, the already described matters may be applied to the form of embodiment of FIG. 4 within the range of compatibility.

In the form of embodiment of FIG. 4, the reciprocating body 71 can be fed by rewinding and winding the linear bodies 51 and 61 by the forward and reverse rotation of the forward and reverse winders 21 and 31 by the forward and reverse rotation of the motor 11. In this case, the rotation of the motor 11 is transferred to the integral body of the forward and reverse winders 21 and 31 through the transmission course in which it is transmitted through the output shaft 11, the spline shaft 19 and the spline cylinder 28. Furthermore, at that time, since the non-rotational screw shaft 41 is spirally engaged into the threaded hole 34, the forward and reverse winders 21 and 31 shift in the axial direction in accordance with the winding pitch and the rewinding pitch of the linear bodies 51 and 61. Therefore, the linear bodies 51 and 61 are closely spiral-wound and rewound in the orderly manner.

Figure 5:
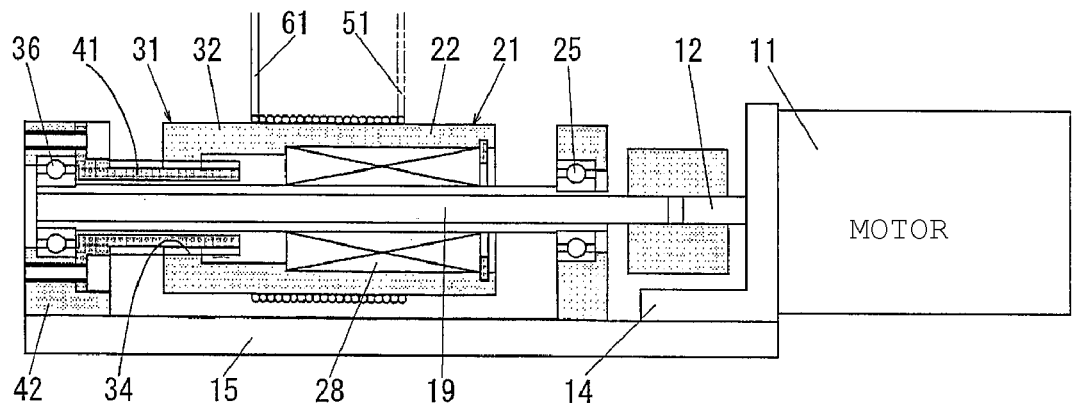
FIG. 5 is a front view of a feeder constructed in accordance with a fifth form of embodiment of the invention and illustrated briefly in a state where a feature thereof is longitudinally sectioned.

The form of embodiment of FIG. 5 relates to the mechanism installed on the installation area A. More particularly, this is unitized for intending to further simplify the form of embodiment of FIG. 4. This will be explained later.

In the form of embodiment of FIG. 5, the rail-type guide stand 16, the movable stand 17 and the traveling member 18 are omitted. In FIG. 5, the integral body (the cylindrical body) of the forward and reverse winders 21 and 31 has no pivotal shafts 23 and 33 and the winding drum 32 of the reverse winder 31 has the threaded hole 34 formed in the inner peripheral thereof. The spline cylinder 28 fitted into the integral body is secured thereto through a thrust washer and others. The screw shaft 41 used in the form of embodiment of FIG. 5 comprises a hollow shaft and has a flange formed on the base end side thereof. The screw shaft 41 is screwed into the threaded hole 34 of the integral body before it is secured to the predetermined position. In FIG. 5, the bearings 36 is held through the bearing stand 42 on the base 15 while the bearing 25 is attached onto the base 15 with an axial distance spaced from the bearing 36. The motor 11 is mounted on the base 15 through the instrument stand 14 and the output shaft 12 thereof has the already described coupling attached thereto, which is identical to that of FIG. 4. The spline shaft 19 of FIG. 5 has the length corresponding to the distance from the bearing 36 to the outputs shaft 12 of the motor 11.

In the form of embodiment of FIG. 5, in case where the integral body of the forward and reverse winders 21 and 31 is supported so as to rotate in the forward and reverse directions and to reciprocate in the axial direction, the integral body having the spline cylinder 28 assembled thereto and the screw shaft 41 fitted therein is disposed between the bearings 25 and 36 and the spline shaft 19 passes through the bearing 36, the screw shaft 41, the spline cylinder 28 and the bearing 25. Then, the leading end of the spline shaft 19 is connected to the output shaft 12 of the motor 11 through the coupling and the flange of the screw shaft 41 is secured through the bolts to the bearing stand 42. In this manner, the spline shaft 19 and the spline cylinder 28 are engaged into each other in the spline fitting manner and the integral body of the forward and reverse winders 21 and 31 is supported so as to rotate in a forward and reverse direction and reciprocate in the axial direction. The not explained matters of the form of embodiment of FIG. 5 are substantially or closely identical to those of the form of embodiment of FIG. 1. Also, the already described matters may be applied to the form of embodiment of FIG. 5 within the range of compatibility.

In the form of embodiment of FIG. 5, the reciprocating body 71 can be fed by rewinding and winding the linear bodies 51 and 61 by forward and reverse rotation of the forward and reverse winders 21 and 31 by the forward and reverse rotation of the motor 11. In this case, the rotation of the motor 11 is transferred to the integral body of the forward and reverse winders 21 and 31 through the transmission course in which it is transmitted through the output shaft 11, the spline shaft 19 and the spline cylinder 28. Furthermore, at that time, since the non-rotational screw shaft 41 is spirally engaged into the threaded hole 34, the forward and reverse winders 21 and 31 shift in the axial direction in accordance with the winding pitch and the rewinding pitch of the linear bodies 51 and 61. Therefore, in the form of embodiment of FIG. 5, the linear bodies 51 and 61 are closely spiral-wound and rewound in the orderly manner, which is identical to the operation of FIG. 4.

Figure 6:
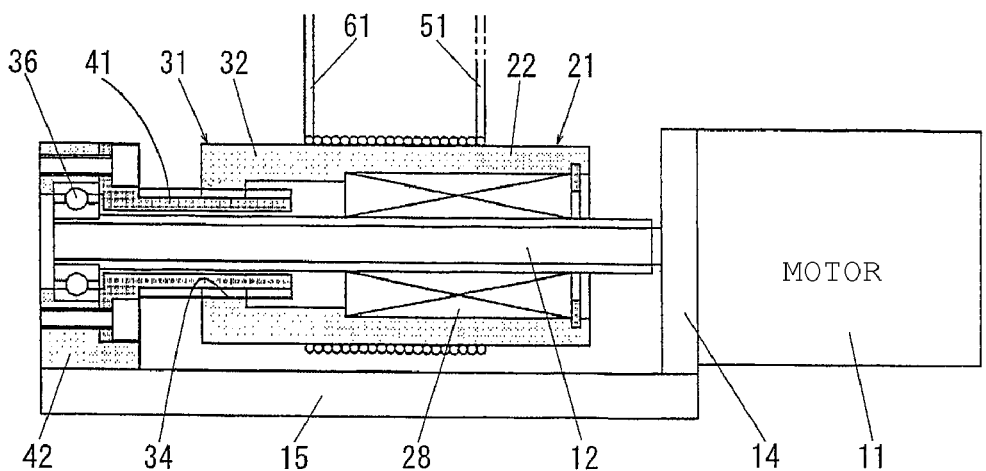
FIG. 6 is a front view of a feeder constructed in accordance with a sixth form of embodiment of the invention and illustrated briefly in a state where a feature thereof is longitudinally sectioned.

The form of embodiment of FIG. 6 corresponds to what is obtained by further simplifying that of FIG. 5. More particularly, in the form of embodiment of FIG. 6, the bearing 25 of FIG. 5 is omitted and the output shaft 12 of the motor 11 also serves as the spline shaft 19. The other construction of the form of embodiment of FIG. 6 is substantially identical to that of FIG. 5. Thus, the already described matters may be applied to the form of embodiment of FIG. 6 within the range of compatibility.

In the form of embodiment of FIG. 6, the rotation of the motor 11 is transferred to the integral body of the forward and reverse winders 21 and 31 because the output shaft (spline shaft) 12 and the spline cylinder 28 is engaged into each other in the spline fitting manner. At that time, since the non-rotational screw shaft 41 is spirally engaged into the threaded hole 34, the forward and reverse winders 21 and 31 shift in the axial direction in accordance with the winding pitch and the rewinding pitch of the linear bodies 51 and 61. Therefore, the form of embodiment of FIG. 6 performs in the same manner as that of the aforementioned form of embodiment.

The form of embodiments of the feeder according to the invention other than the aforementioned forms of embodiments are illustrated in FIGS. 7 through 11. In this form of embodiment, the fundamental construction of what are disposed on the installation area A is substantially identical or corresponds to that of FIG. 5 and the fundamental construction of what are disposed on the operation area B is substantially identical or corresponds to that of FIG. 1. Thus, in the form of embodiment of FIGS. 7 through 11, the explanation of the components common to those of the already described forms of embodiment is omitted because the components of the already described forms of embodiment can be referred to and the different components will be mainly explained later.

Figure 7:
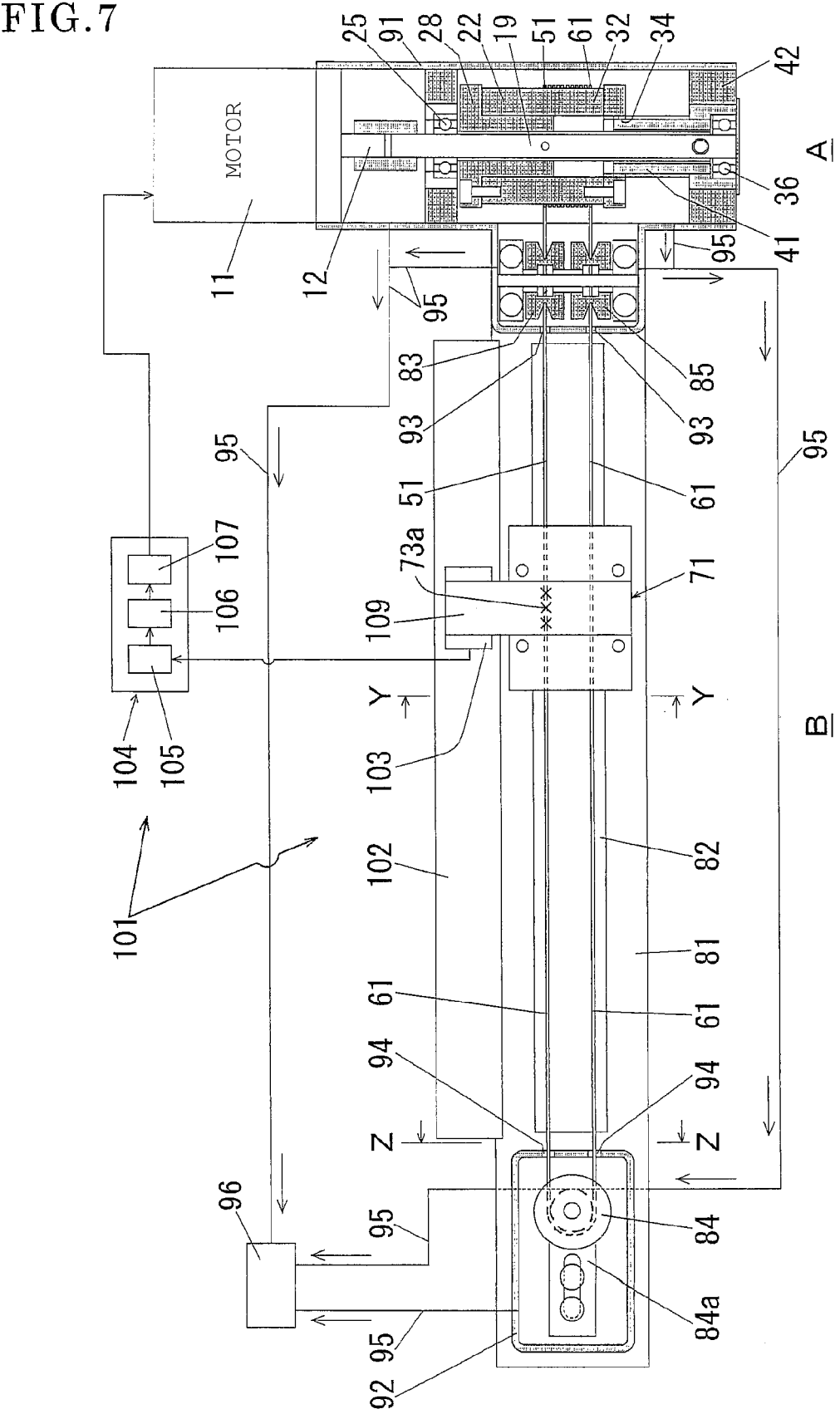
FIG. 7 is a plane view of a feeder constructed in accordance with a seventh form of embodiment of the invention and illustrated briefly in a state where portions thereof are broken away.
Figure 8:
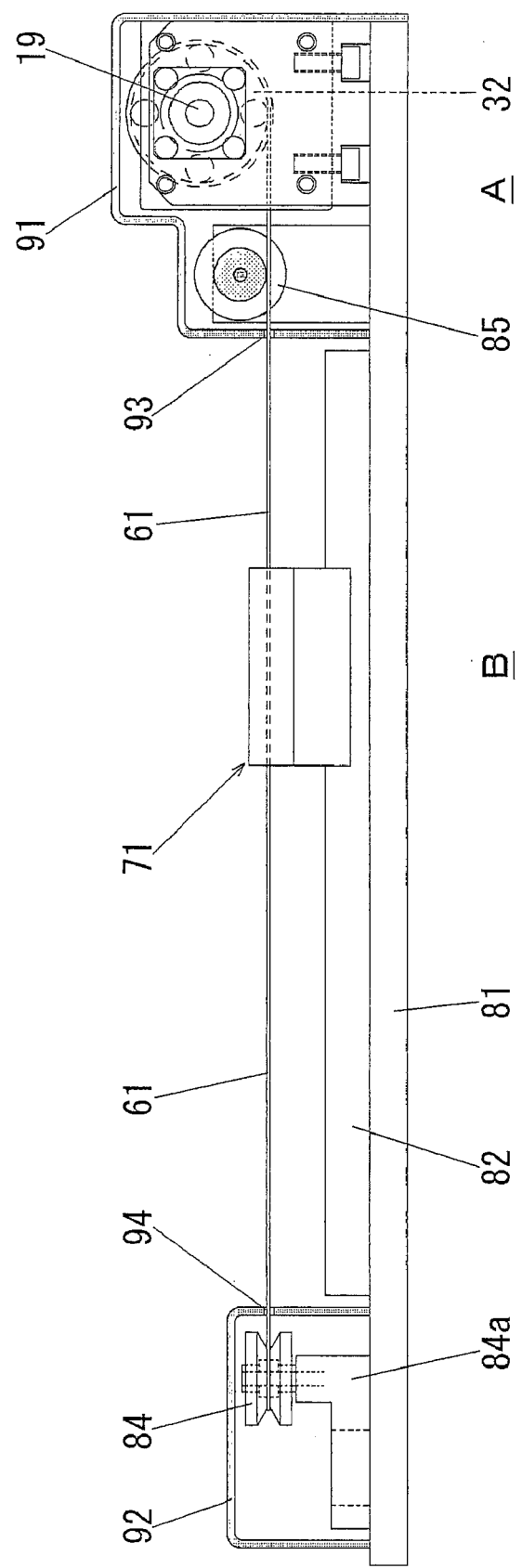
FIG. 8 is a front view of a feeder constructed in accordance with the seventh form of embodiment of the invention and illustrated briefly in a state where portions thereof are broken away.
Figure 9:
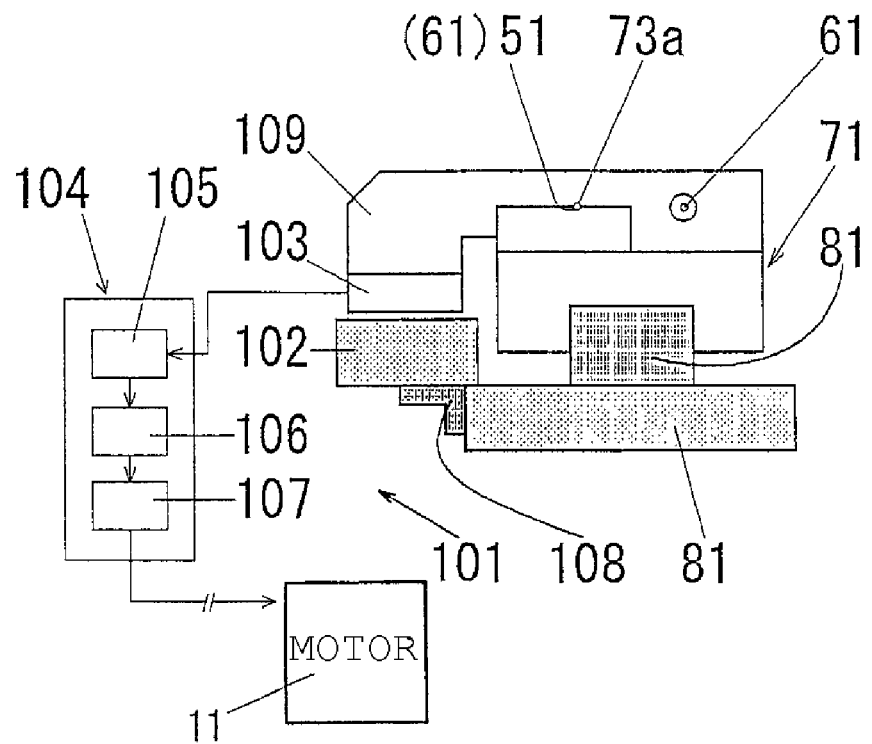
FIG. 9 is a cross-sectional view of the feeder along the line Y-Y of FIG. 7.
Figure 10:
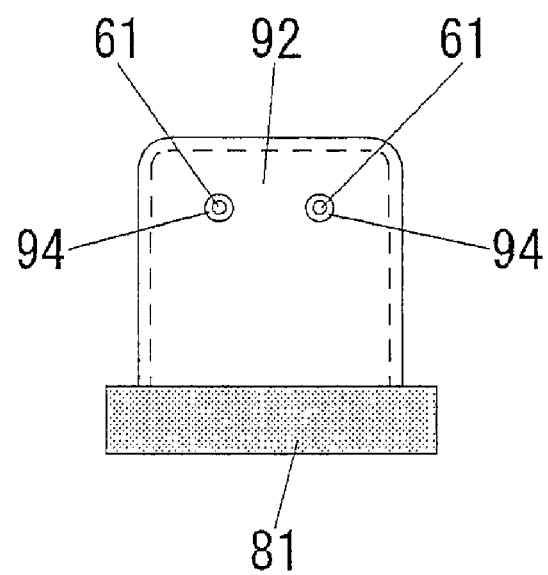
FIG. 10 is a cross-sectional view of the feeder along the line Z-Z of FIG. 7.

As apparent from FIGS. 7 and 8, the installation area A and the operation area B are closer to each other than those of the already described forms of embodiment. Therefore, the components of the apparatus are installed on the single base 81. In this case, the forwardly and reversely winding linear bodies 51 and 61 engaging the forward and reverse winders 21 and 31 and the rotation wheels 83 through 85 pass through the reciprocating body 71 and the boundary portion of the linear bodies 51 and 61 is clamped onto the reciprocating body 71 through the fixture portion 73a thereof as shown in FIGS. 7 and 9.

In the form of embodiment of FIGS. 7 through 10, the sections of the feeder where dust tends to be generated due to friction of the parts relative to each other and so on are covered with dust covers 91 and 92. More particularly, the components including the forward and reverse winders 21 and 31, the rotation wheels 83 through 85, the bearings and other components are covered with the duct cover 91 and the components including the rotation wheel 84 and the bearing stand 84a are covered with the dust cover 92. In this case, the dust cover 91 is secured to the end peripheral face of the motor 11 and the bearing stand 42 while the dust cover 92 is secured to the base 81. The forwardly and reversely linear bodies 51 and 61 are adapted to move in and out the dust covers 91 and 92 through the small holes 93 and 94 formed therein. The dust covers 91 and 92 have air-tightness kept except to the small holes 93 and 94. If a portion, portions or all of the covered mechanism should be extendable in the axial direction, then the dust cover 91 should be also extendable in the same direction. In this case, the extendable portion of the dust cover may be desirably of bellows type. In this form of embodiment, the dust covers 91 and 92 may be adapted to be sucked by vacuum suction means. Thus, there may be used a suction machine 96 provided with a vacuum pump (not shown) and predetermined number of suction pipes 95. The ends of the suction pipes 95 are connected to the dust covers 91 and 92. In this manner, the dust covers 91 and 92 are sucked through the suction pipes 95 by the suction machine 96. Although not shown, the exhaust system of the suction machine 96 communicate with dust treatment section.

The aforementioned dust covers 91 and 92 may be formed of metal or plastic. In FIGS. 7 through 10, the other components may correspond to those of the already described forms of embodiment or may be of conventional or well-known type.

In the form of embodiment of FIGS. 7 though 11, the reciprocating body 71 travels over the guide means 82 in a non-contact manner. In this case, the non-contact type guide means 82 may be of magnetic levitation type or air-sliding type. As well-known, in the magnetic levitation type, one of the reciprocating body 71 and the guide means 82 may be magnetic material while the other may be of magnet (one having magnet) or otherwise both of them may be magnet (one having magnet). The system using the magnetic material and the magnet is of suction type and the reciprocating body 71 is magnetically floated over the guide means 82 while the magnetic force is controlled so that the gap between them is kept constant. The system using the magnets for both of the reciprocating body 71 and the guide means 82 is of repulsion type. In this case, the guide means 82 may have a guide adapted to stabilize the floating direction. As well-known, in the air-sliding type, an air membrane is disposed in the interface of the reciprocating body 71 and the guide means 82. Therefore, on the reciprocating body 71 and/or the guide means 82 is provided air injection means, through which an air is supplied in the interface of the reciprocating body 71 and the guide means 82. Alternatively, the reciprocating body 71 may travel on the guide means 82 in a rolling or sliding manner and in this case, grease having low dust occurrence may be enclosed and held between the reciprocating body 71 and the guide means 82.

In the form of embodiment of FIGS. 7 through 10, there is installed scale feedback means 101 for controlling the feeding distance (moving distance) of the reciprocating body 71. The scale feedback means 101 comprises a scale 102, a detection head 103 and a controller 104. The details of the scale feedback means 101 will be described later with reference to FIGS. 7 and 9. The scale 102 disposed along the guide means 82 is attached through a fixture device 108 to the base 81. The detection head 103 for reading the scale 102 is attached through an attachment member 109 to the reciprocating body 71. The controller 104 for controlling the motor is connected to the detection head 103 for receiving the detection signal from the detection head 103 and also connected to the motor 11 for feeding the control signal to the motor 11. For one example, if the scale feedback means 101 mainly comprises a magnetic linear scale, then the scale 102 may be formed of a magnetic ribbon scale, the detection head 103 may be of a magnetic sensor head and the controller 104 may comprise a combination of a detector 105, a positioning counter 106 and an inverter 107. For another example, if the scale feedback means 101 mainly an optical scale, the scale (main scale) 102 comprises one obtained by vapor-depositing metal memories on a long optical glass with a predetermined pitch, the detection head 103 comprise one having an index scale, a light emitter and a light receiver for producing two phase signal (light signal and dark signal, for instance) having a phase difference of 90 degree, and the controller 104 may be of the aforementioned type. The latter detection head 103 may have the frame cylindrical or C-shaped and the elements of the detection head may be disposed so that the light emitter is on the upper side, the index scale is on the middle and the light receiver is on the lower side. The scale (main scale) 102 is disposed between the light emitter element and the light receiver element.

In the form of embodiment of FIGS. 7 through 10, the reciprocating body 71 can be fed by rewinding and winding the linear bodies 51 and 61 by the forward and reverse rotation of the forward and reverse winders 21 and 31 by the forward and reverse rotation of the motor 11. In this case, since the places of the feeder where the dust tends to be generated due to the friction of the parts relative to each other and so on are covered with the dust covers 91 and 92, the dust is never scattered around the neighborhood. Since the reciprocating body 71 moves in the state where it is held at the non-contact with the guide means 82, the problem of the dust never also arises. Similarly, since the detection head 103 and the scale 102 of the scale feedback means 101 are also in the non-contact state, the problem of the dust never arises. Thus, the movement area of the reciprocating body 71 can be held at the high degree of cleanness. In addition thereto, since the dust covers 91 and 92 are positively sucked by the suction machine 96 so as to collect the dust, the prevention from scattering the dust can be positively accomplished, which causes the atmosphere of the neighborhood including the reciprocating body 71 to have the higher degree of cleanness.

In the form of embodiment of FIGS. 7 though 11, the scale feedback means 101 directly measures the feeding distance (movement distance) of the reciprocating body 71 to feedback it to the motor 11. More particularly, the detection head 103 on the side of the reciprocating body 71 reads the scale 102 to detect the feeding distance of the reciprocating body 71 and to input the detection signal to the controller 104, which inputs the predetermined control signal obtained by its operational calculation. This can heighten the precision of the feeding distance of the reciprocating body 71. In the case where the scale feedback means 101 is mainly of the magnetic ribbon scale type, the magnetic sensor head (the detection head 103) reads the magnetic lattice pattern (the scale) of the magnetic ribbon scale (the scale 102) to electrically measure the amount of movement of the position of the reciprocating body 71 and thereafter the detection signal is processed by the detector 105 and the positioning counter 106 and input through the inverter 107 to the motor 11. In the case where the scale feedback means 101 is mainly of optical scale type, the strength (lightness and darkness) of the light (infrared rays) irradiated onto the main scale (the scale 102) through the index scale from the light emitter element on the upper side of the detection head 103 is detected by the light receiver element, the electric signal based on the lightness and the darkness is operationally calculated by the counter of the controller 104 to measure the displacement distance and the control signal determined by the result of measurement is input to the motor 11.

The matters explained with reference to FIGS. 7 through 10 may be applied to the forms of embodiments of FIGS. 1 through 6 within the technical scope of compatibility.

The disconnection detectors 201 and 301 for the linear bodies 51 and 61 and the brakes 401 and 501 for the reciprocating body 71 will be explained with reference to FIG. 11.

The disconnection detector 201 among the disconnection detectors 201 and 301 mainly comprises a stopper 202, a receiver 203 and a switch 204 and the disconnection detector 301 mainly comprises a stopper 302, a receiver 303 and a switch 304. These two disconnection detectors 201 and 301 are assembled within the reciprocating body 71 having the inner space 74 as described later.

Figure 11:
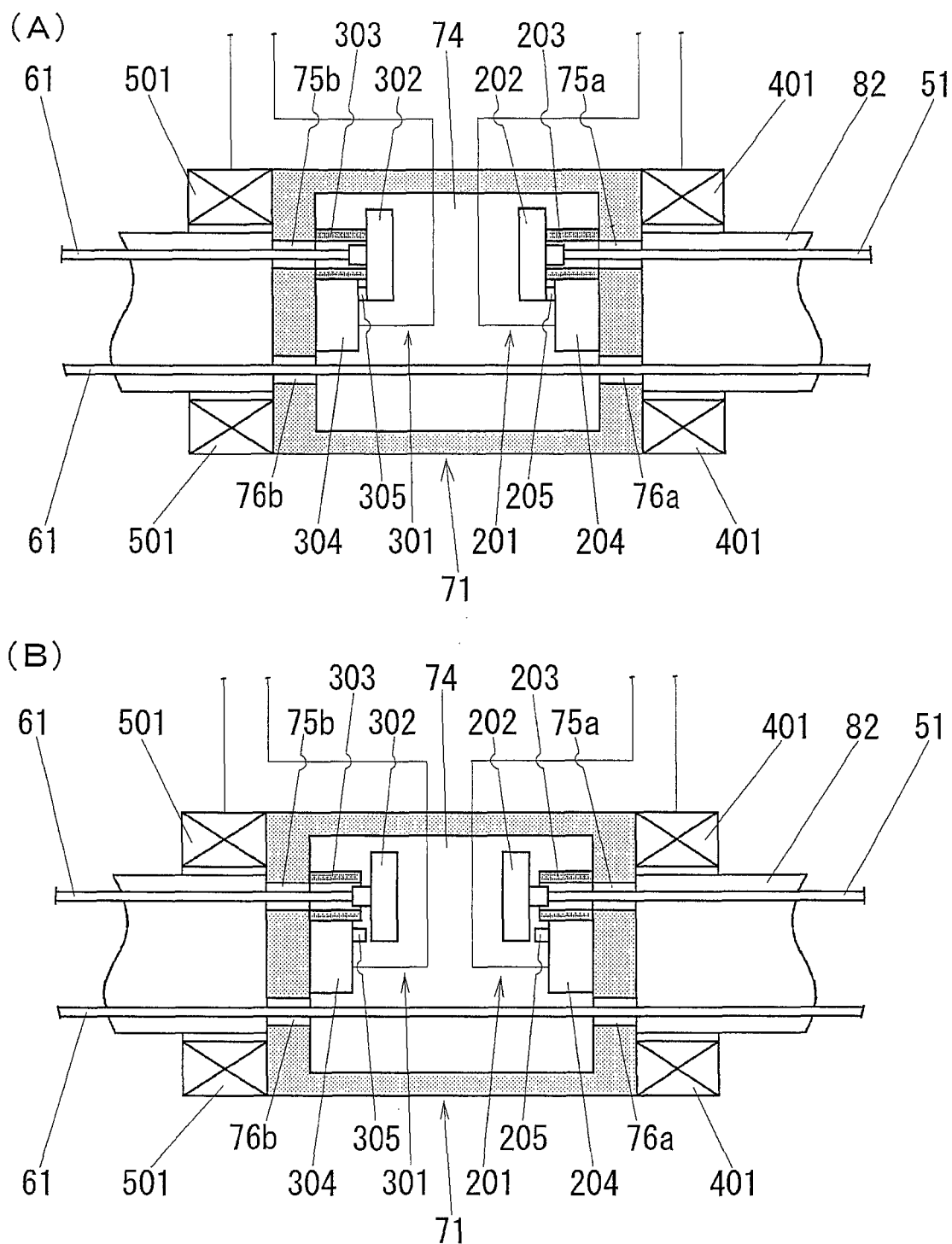
FIG. 11 is a plane view of a disconnection detector for the feeder of the invention briefly illustrating the on-off state thereof in the state where a feature thereof is cross-sectioned.

In FIG. 11, the reciprocating body 71 comprising a combined cover and box has one pair of through-holes 75a and 75b and another pair of through-holes 76a and 76b formed in the front and rear walls, respectively as viewed in the movement direction. The two stoppers 202 and 302 are in the board-like form and have a fixture portion for the linear bodies at the center of the board-like face. The two receivers 203 and 303 are in the cylindrical form. The two switches 204 and 304 are resiliently urged in the direction where the switches are closed and have buttons 205 and 305 protruding out of the switch boxes. The receiver 203 disposed within the reciprocating body 71 is secured to the end of the wall on the inner side of the through-hole 75a so as to concentrically communicate with the through-hole 75a and similarly, the receiver 303 disposed within the reciprocating body 71 is also secured to the end of the wall on the inner side of the through-hole 75b so as to concentrically communicate with the through-hole 75b. The two switches 204 and 304 are secured to the walls of the reciprocating body 71 so that the switch 204 is disposed adjacent to the receiver 203 while the switch 304 is disposed adjacent to the receiver 303. In FIG. 11, the linear bodies 51 and 61 pass through the through-holes 75a and 75b, 76a and 76b, respectively. More concretely, the end of the forwardly winding linear body 51 passes through the through-hole 75a and the receiver 203 and is withdrawn into the inner space 74 of the reciprocating body 71, the middle portion of the reversely winding linear body 61 passes through the through-holes 76a and 76b in the form of straight line and the end of the reversely winding linear body 61 passes through the through-hole 75b and the receiver 303 and is withdrawn into the inner space 74 of the reciprocating body 71. The one stopper 202 is attached to the end of the forwardly winding linear body 51 withdrawn into the reciprocating body 71 and engages against the end face of the receiver 203 by the tension applied to the forwardly winding linear body 51. At that time, the stopper 202 pushes the button 205 as shown in FIG. 11(A) so as to open the one switch 204. The other stopper 302 is attached to the end of the reversely winding linear body 61 withdrawn into the reciprocating body 71 and engages against the end face of the receiver 303 by the tension applied to the reversely winding linear body 61. At that time, the stopper 302 pushes the button 305 as shown in FIG. 11(A) so as to open the other switch 304.

The brakes 401 and 501 illustrated in FIG. 11 comprise an electromagnet having a coil, a yoke and others. Both of the brakes 401 and 501 are separately attached to the front face and the rear face of the reciprocating body 71. The guide means 82 in the form of rail comprises magnetic material. Both of the brakes 401 and 501 are connected to the not shown power source and the switches 204 and 304 serve to turn on and off the brakes 401 and 501, respectively. Thus, the brakes 401 and 501 are connected to the switches 204 and 304, respectively. Although not shown, sometime the motor 11 is electrically turned on and off by the switches 204 and 304. In this case, the relationship of the motor 11, the brakes 401 and 501 and the switches 204 and 304 is so set that when the brakes 401 and 501 are switched on, the motor 11 is switched off and when the motor 11 is switched on, the brakes 401 and 501 are switched off.

When the reciprocating body 71 should be fed, the forward and reverse winders 21 and 31 are forwardly and reversely rotated by the forward and reverse rotation of the motor 11 whereby the linear bodies 51 and 61 are rewound and wound, respectively as already described. In this case, if the operation is normally performed, a constant tension is applied to the linear bodies 51 and 61. The stoppers 202 and 302 to which the force is applied hold the state of opening the switches 204 and 304 because the buttons 205 and 305 are pushed. If the forwardly winding linear body 51 is disconnected due to an unexpected accident, the tension applied to the linear body 51 gets zero. At that time, as shown in FIG. 11(B), the stopper 202 instantly moves far away from the end face of the receiver 203 and the button 205 is resiliently returned so as to close the contacts of the switch 204. In other words, the brake 401 is switched off (the motor switched off) and since the brake 401 draws the guide means 82, the reciprocating body 71 stops soon. It is true if the reversely winding linear body 61 is disconnected. More particularly, since the series operations of the immediate reduction of the tension to the reversely winding linear body 61, the movement of the stopper 302 far away from the end face of the receiver 303, the resilient return of the button 305 (closing the switch 304) and the switching-off of the brake 501 instantly occur and the brake 501 draws the guide means 82, the reciprocating body 71 stops soon. In this manner, as the reciprocating body 71 immediately stops by the brakes 401 and 501, the safety is maintained and the damage can be reduced to the minimum.

The disconnection detectors 201 and 301 and the brakes 401 and 501 described with reference to FIG. 11 may be applied to any of the illustrated feeders. The signals of the disconnection detectors 201 and 301 may be in the form of switching either on or off on the disconnection of the linear body. Ones of the disconnection detectors 201 and 301 and the dampers 401 and 501 may be omitted. Otherwise, the brakes 401 and 501 may be in the form of mechanical brake, which forces a brake shoe against the guide means 82.

POSSIBILITY OF UTILIZATION IN INDUSTRIES

The feeder of the invention solve the problems, which appear in the conventional feeder such as the belt conveyor, the screw feeder, the cylinder type feeder, the timing belt feeder, the robot, etc. Thus, the feeder of the invention is versatile for various usages in place of the conventional feeder such as the belt conveyor, the screw feeder, the cylinder type feeder, the timing belt feeder, the robot, etc. Especially, with the prevention of generation of the dust provided, it can be suitably applied to the fields where ultra-high degree of cleanness is required and with the scale feedback means provided, it can be suitably applied to the feeding of the reciprocating body with the high precision.

The invention claimed is:

1. A feeder characterized by comprising a forward winder which rotates forwardly and reversely, a reverse winder which rotates forwardly and reversely, a forwardly winding linear body to be wound and rewound through said forward winder, a reversely winding linear body to be wound and rewound through said reverse winder and a reciprocating body to forwardly and reversely move by means of guide means when it is subject to a forward force or a reverse force and wherein said forwardly winding linear body to be held so as to be wound and rewound by said forward winder and said reversely winding linear body to be held so as to be wound and rewound by said reverse winder are connected to said reciprocating body, said forward winder on winding rotation and said reverse winder on rewinding rotation rotate in synchronism and phase with each other in the winding and rewinding directions, respectively, said forward winder on rewinding rotation and said reverse winder on winding rotation rotate in synchronism and phase with each other in the rewinding and winding directions, respectively, the amount of winding said forwardly winding linear body by said forward winder and the amount of rewinding said reversely winding linear body by said reverse winder are equal to each other and the amount of rewinding said forwardly winding linear body by said forward winder and the amount of winding said reversely winding linear body by said reverse winder are equal to each other.

2. A feeder as set forth in claim 1 and wherein said forward and reverse winders are integrated with each other in a co-axial manner.

3. A feeder as set forth in claim 1 and wherein said forward and reverse winders are independently provided.

4. A feeder as set forth in claim 1, wherein said forward and reverse winders on winding rotation move in an axial direction corresponding to the winding pitch of said linear bodies.

5. A feeder as set forth in claim 1, wherein a portion of said forwardly winding linear body is secured to a winding drum of said forward winder while a portion of said reversely winding linear body is secured to a winding drum of said reverse winder.

6. A feeder as set forth in claim 1, wherein a friction occurrence portion is covered with a dust cover.

7. A feeder as set forth in claim 6 and wherein a suction machine is connected to said dust cover for sucking air from the inside of said dust cover.

8. A feeder as set forth in claim 6, wherein said forwardly and/or reversely winding linear bodies pass through said duct cover in a non-contact state.

9. A feeder as set forth in claim 1, wherein said reciprocating body is supported in a reciprocating manner through non-contact type guide means.

10. A feeder as set forth in claim 1, wherein said feeder is further provided with scale feedback means comprising a linear scale to indicate the distance of movement of said reciprocating body, a non-contact detection head to read the position of said reciprocating body corresponding to said linear scale and a controller to input a feedback signal to said motor for said forward and reverse winders, respectively when the detection signal is received from said detection head, and wherein said linear scale is provided along the longitudinal direction of said guide means, said detection head is installed on said reciprocating body and said detection head is connected to said controller.

11. A feeder as set forth in claim 1, wherein said feeder is provided with a disconnection detector for detecting a disconnection of said forwardly winding linear body and/or said reversely winding linear body corresponding to said forwardly winding linear body and/or said reversely winding linear body and provided on the movement area of said reciprocating body with a brake for stopping said reciprocating body when the disconnection of said forwardly winding linear body and/or said reversely winding linear body occur and wherein said brake for receiving said disconnection detection signal from said disconnection detector when said disconnection occurs is adapted to stop said reciprocating body and an electric power source for said motor for said forward winder and/or said reverse winder is cut in synchronism with this.

* * * * *